United States Patent [19]
Willard, Jr. et al.

[11] Patent Number: 5,868,190
[45] Date of Patent: Feb. 9, 1999

[54] RUN-FLAT TIRE WITH AN IMPROVED BEAD TO RIM INTERFACE

[75] Inventors: Walter Lee Willard, Jr.; James Milo Endicott, both of Greenville; Jeffrey Scott Craddock, Simpsonville, all of S.C.

[73] Assignee: Michelin Recherche et Technique, S.A., Switzerland

[21] Appl. No.: 872,579

[22] Filed: Jun. 10, 1997

[51] Int. Cl.⁶ .......................... B60C 15/00; B60C 15/04; B60C 15/06; B60C 17/00
[52] U.S. Cl. .......................... 152/517; 152/539; 152/540; 152/541; 152/543; 152/544; 152/547; 152/550; 152/552
[58] Field of Search ...................................... 152/517, 539, 152/540, 541, 543, 544, 547, 550, 552, 555

[56] References Cited

U.S. PATENT DOCUMENTS

| | | |
|---|---|---|
| 3,682,223 | 8/1972 | Simpson. |
| 3,983,918 | 10/1976 | French. |
| 4,046,183 | 9/1977 | Takahashi et al.. |
| 4,120,338 | 10/1978 | Mirtain. |
| 4,203,481 | 5/1980 | Ranik, Jr.. |
| 4,235,273 | 11/1980 | Edwards et al.. |
| 4,508,153 | 4/1985 | Tanaka et al.. |
| 4,554,960 | 11/1985 | Pompier. |
| 4,779,658 | 10/1988 | Kawabata et al.. |
| 4,790,364 | 12/1988 | Lobb et al.. |
| 5,033,524 | 7/1991 | Ohtsuka. |
| 5,158,627 | 10/1992 | Saneto et al.. |
| 5,164,029 | 11/1992 | Oohashi et al.. |
| 5,263,526 | 11/1993 | Oare et al.. |
| 5,368,082 | 11/1994 | Oare et al.. |
| 5,427,166 | 6/1995 | Willard, Jr.. |
| 5,464,051 | 11/1995 | Beard et al.. |
| 5,511,599 | 4/1996 | Willard, Jr.. |
| 5,511,600 | 4/1996 | Glotzbach. |

FOREIGN PATENT DOCUMENTS

| | | |
|---|---|---|
| 0 637 519 | 2/1995 | European Pat. Off.. |

OTHER PUBLICATIONS

Abstract of JP–A–5–178037, 20 Jul. 1993, Japan (Ohtsu Tire & Rubber Co Ltd).
Abstract of JP–A–2–179513, 12 Jul. 1990, Japan (Yokohama Rubber Co Ltd).
Tire and Rim Association, Inc. Handbook 1997, 8–04 to 8–09.

*Primary Examiner*—Adrienne Johnstone
*Attorney, Agent, or Firm*—Alan A. Csontos; Robert R. Reed

[57] ABSTRACT

The run-flat tire has a tread for contacting a ground surface and a belt package with belt plies interior to the tread for support of the tread. A plurality of radially reinforced carcass layers are positioned interior to the belt plies and include at least one carcass layer that extends between spaced apart annular beads. The tire has a pair of sidewalls each extending radially inward from shoulders at lateral edges of the belt package to the annular beads. The sidewalls have a plurality of sidewall stiffening members to support the tire during a loss of inflation pressure. The carcass layers are disposed with the sidewall stiffening members to help support the run-flat tire with a loss of inflation pressure. The spaced apart beads have a unique design including bead cores placed at a predetermined diameter with respect to a rim diameter, dual bead fillers above the bead cores, a heel corner spaced at a radial gap distance from a rim flange and rim interface components having a seat interface distance below the bead core for mounting the run-flat tire on a conventional rim and for sustaining the run-flat tire on the conventional rim with a loss of inflation pressure within the run-flat tire.

9 Claims, 4 Drawing Sheets

RUN-FLAT TIRE WITH AN IMPROVED BEAD TO RIM INTERFACE

BACKGROUND OF THE INVENTION

1. Field of the Invention

This invention relates to radial pneumatic tires used for vehicles, and more particular to the design of the lower sidewall and bead area of a run-flat tire to reduce the effort in mounting the tire on a standard rim and to improve the retention of the tire on the standard rim during a loss of inflation pressure.

2. Description of the Art

The need to carry a spare tire in a vehicle to replace a flat tire, or more basically the need for a vehicle operator to stop and replace a deflated tire at an inconvenient location, has long been a concern of the vehicle operator. Many of these concerns can be addressed with the use of a run-flat tire for allowing the operator to reach a safe place or a service station before replacing a tire which has lost its inflation pressure.

One of the problems associated with providing a run-flat tire is to maintain acceptable performance of the run-flat tire upon deflation. Essential to solving this problem is to provide a run-flat tire which stays on the rim and keeps the vehicle supported so the vehicle may drive to a more convenient location to repair or replace the tire. The tire is generally retained on the rim by the inflation pressure in the tire during normal running of the vehicle. Absence of this inflation pressure tends to cause the tire to want to be disconnected from the rim. This is especially true during lateral maneuvers of the vehicle. Solutions to this rim unseating problem include providing a special rim having a hump or a depression for engaging the run-flat tire having a corresponding special bead design. Typical efforts to modify the tire/rim seat interface profiles are disclosed in U.S. Pat. Nos.; 4,779,658; 5,263,526; and 5,427,166. However, the use of standard rims with these special run-flat tires will not optimize the bead unseating problem. In addition, the effort required to seat these special run-flat tires on rims with special tire/rim interface designs is excessive.

Part of the rim unseating and vehicle handling problems have been solved by the use of sidewall reinforcing members in a run-flat tire to provide laterally stiffened sidewalls. Typical run-flat tires with reinforced sidewalls are disclosed in the three U.S. Patents disclosed above as well as in U.S. Pat. Nos. 5,158,627; 5,368,082; and 5,511,599. The crescent shaped sidewall reinforcing members are essential for holding the tread displaced from the rim to make the tire respond to vehicle maneuvers with the loss of inflation pressure in the run-flat tire. Tires with sidewall reinforcing members are used with the improved bead seat design of this invention.

The heavy duty radial tire of U.S. Pat. No. 5,085,260 discloses a smaller apex filler along with a number of carcass layers turned up around the bead core. The length of carcass turn-up portions and the position of the bead core in relation to the rim flange height is used to obtain bead strength. Accuracy in the placement of end points of each carcass layer is important in the teachings of this 1992 patent.

Changing the shape, dimensions and material properties of components in the lower sidewall and bead of a tire can affect their ability to resist higher forces and moments. The run-flat tire can be designed to take advantage of changing shape, dimensions and material properties. One component which can be easily modified is the bead filler. A bead filler which has been extended radially into the area of the sidewall in U.S. Pat. Nos. 4,640,329; 4,766,940; and 5,048,584. This extension provides improved transverse and radial load supporting capabilities for the tire. However, the material properties of the filler needs to be different near the bead core than radially outward in the sidewall to resist different loads in these different locations of the run-flat tire and to facilitate an efficient tire fabrication process. The disclosures of U.S. Pat. Nos. 4,046,183; 4,120,338; and 4,508,153 and Japan Patent No. 5-178037 illustrate the use of bead fillers having two parts; being one part adjacent a bead core and another part extending into the sidewall area. These two-part bead fillers use different size, shape and material properties for each of the two parts. The bead fillers of these references also require additional reinforcing layers placed adjacent to the bead fillers to improve durability and strength of the bead region of the tire. The need remains to simplify the use of two-part bead fillers while maintaining their advantages.

Another design parameter which can be incorporated to transfer loads from the vehicle to the ground by way of the run-flat tire is the use of the rim flange. If a tire can be made to contact the flange of the rim, the vehicle loads can transfer loads to the rim at its flange. The rim flange contact is also useful in transferring lateral loads between the tire and the rim that would otherwise act to unseat the tire from the rim. Rim flange seating of the tire is well known in the art as disclosed in U.S. Pat. Nos. 3,983,918; 4,203,481; and 5,033,524. Both U.S. Pat. No. 3,983,918 and U.S. Pat. No. 5,033,524 disclose the use of an additional product in the tire to interface with the rim flange. A gap between the rim and a buttress on the tire in U.S. Pat. No. 3,983,918 is closed when the buttress contacts the rim flange. The tire to rim flange contact is known to help with vehicle handling in some maneuvers of the vehicle and to degrade the vehicle handling with other maneuvers. It is important to know at what operating condition the tire to rim flange can be used as an advantage. The need remains to identify when contact of a run-flat tire with a rim flange can be useful for the partially inflated run-flat tire.

A further problem exists with the pressure of the run-flat tire on the rim seat portion of the tire to rim interface. A tire is mounted on a rim with a combination of inflating and pushing the tire to its proper place on the rim. The rubber in contact with the rim must be durable and effective in sealing the interface against loss of inflation pressure caused by air leaking out from inside the tire. It is well known in the art to use an additional rubber layer for making direct contact with the rim seat portion. In U.S. Pat. No. 5,511,599 a rim seat ply is used to making contact with a rim. Economy in manufacturing the run-flat tire can be realized by a single bead interface rubber. The use of a single rubber component for the bead interface rubber is disclosed in U.S. Pat. Nos. 4,235,273; 4,790,364; and 5,033,524. The profile of the innermost area of the bead interface rubber is also important for providing desired pressures at the tire to rim interface. In U.S. Pat. Nos. 4,554,960 and 5,464,051 a profile is disclosed for providing a proper bead to rim interface seat area. The extent of a single bead interface rubber which can also provide a rim flange seat and a durable bead toe remains unsolved by these references. The material properties of this bead interface rubber also remains undefined.

Even with the improvements of the references the need remains to have a lower sidewall and bead structure which has an improved bead retention capability without compromising the ability to sustain the same vehicle loads and without the necessity of added reinforcing layers or other non-standard tire components. A coexisting need is to be able to use run-flat tires on standard rims that generally exist in the replacement market at the present time. Both of these needs should be achieved while maintaining a manufacturing process with limited changes and preferably lower costs for the run-flat tire.

Accordingly, one object of this invention is to provide a run-flat tire having annular beads designed so that the run-flat tire can be easily mounted on a standard rim of a vehicle without excessive over-pressures.

Another object of the present invention is to provide a run-flat tire having annular beads designed to maintain a good seal between the tire and the rim for maintaining an inflation pressure within the tire.

Yet another object of the present invention is to provide a run-flat tire having annular beads designed so that the run-flat tire strongly resists being removed from the standard rim during loss of inflation pressure.

A further object of the present invention is to simplify the design of the bead area to reduce the number of different rubber components used in the bead area when manufacturing the run-flat tire.

Still another object of the present invention is to use materials in the bead area which are resistant to damage when mounting the run-flat tire on the standard rim and resistant to loss of air between the tire and the rim during normal operation of the run-flat tire on the vehicle.

SUMMARY OF THE INVENTION

The run-flat tire of this invention is easily mounted on a rim of a vehicle for normal operation of the vehicle. The tire is useful for many vehicles including passenger cars, light trucks, trucks and the like. The tire has a tread portion for contacting a ground surface and a belt package with belt plies interior to the tread for support of the tread. A plurality of carcass layers positioned interior to the belt plies extend between spaced apart annular beads. The tire has a pair of sidewall portions each extending radially inward from shoulders at lateral edge of the belt package to the annular beads. The sidewalls have a plurality of sidewall stiffening members to support the tire during a loss of inflation pressure. The carcass layers are disposed with the sidewall stiffening members to help support the run-flat tire with a loss of inflation pressure. The spaced apart beads have a unique design including bead cores placed at a predetermined diameter with respect to a rim diameter, dual bead fillers above the bead cores, a heel corner spaced at a radial gap distance from a rim flange and rim interface components having a seat interface distance below the bead core for mounting the run-flat tire on a conventional rim and for sustaining the run-flat tire on the conventional rim.

In one embodiment of the present invention a radial pneumatic tire is provided for mounting on a rim of a vehicle to sustain vehicle loads by contacting a ground surface at a contact patch of said tire when inflated and with a loss of inflation pressure. The tire comprises a plurality of carcass layers disposed about sidewall stiffening members for supporting vehicle loads with the loss of inflation pressure. A pair of spaced apart annular beads are interconnected by said carcass layers. Each one of the beads has a bead core, a bead filler and rim interface components for mounting and sustaining the tire on a conventional rim. The bead core has an annular coil of wire filaments forming a polygonal cross-section having a predetermined tensile strength and a flat innermost surface defined by an imaginary plane contacting the filaments. The bead core has an internal diameter, measured to said innermost surface of the bead core when the tire is cured and the annular beads are spaced apart an axial distance corresponding to a width of the conventional rim on which the tire is to be mounted, which is about 5 millimeters larger than a standard rim diameter of the conventional rim. The rim interface components of the beads include elastomeric portions being a toe portion, a rim seat portion and a heel flange portion. The elastomeric portions have a predetermined hardness values and modulus for interfacing with the conventional rim. The heel flange portion of the rim interface components has a heel corner radially spaced from a rim flange of said conventional rim, over a substantial portion of a circumferential extent of said heel flange portion, a radial gap distance when the tire is mounted on the rim. The radial gap distance has a value in the range of about 3 millimeters to about 8 millimeters when the tire has 100 percent of a conventional inflation pressure and a conventional maximum tire loading from the vehicle loads. The radial gap distance has a zero value adjacent the contact patch of the tire during 100 percent of the conventional loading from the vehicle loads with a reduced inflation pressure being less than about 15 percent of the conventional inflation pressure. The rim interface components have a seat interface distance, measured radially between the flat interface surface of a respective bead core and the innermost surface of said rim seat portion at a lateral centerline of the respective bead core of the tire after the tire is cured, in a range of values of about 4 millimeters to about 6 millimeters. Wherein the tire is easily mounted on the conventional rim and remains on the rim with the loss of inflation pressure.

In one embodiment the run-flat tire of this invention has a first carcass layer positioned interior to the belt package which extends from bead to bead and forming a carcass turn-up that partially encompasses a respective bead core and extends radially outward to an end point radially outward of a flange of the rim when the run-flat tire is mounted on the rim. A second other carcass layer extends from bead to bead and terminates at each end near to a respective bead core to overlap with the turn-up portion. A third carcass layer is also preferred which extends from bead to bead to terminate at each end near a respective bead core. An innerliner ply is positioned in the tire to the inside of the inner carcass ply and forms the inner surface of the tire to help retain an inflation pressure within the tire. Alternately, two of the carcass layers can be discontinued in a central portion of the crown area of the run-flat tire below belt package.

In another embodiment a first bead filler of each annular bead extends radially outward of the bead core. A second bead filler is placed radially inward of the first bead filler. The first bead filler has a tapered cross-section with a decreasing thickness outward of the second bead filler. The first bead filler extends radially outward into the sidewall of the tire to provide a sidewall stiffening member to help support the run-flat tire with a loss of inflation pressure. The second bead filler extends a relatively short distance radially outward from the bead core and is made of a softer material than the first bead filler.

BRIEF DESCRIPTION OF THE DRAWINGS

Further features of the present invention will become apparent to those skilled in the art to which the present invention relates from reading the following with reference to the accompanying drawings, in which:

FIGS. 2 and 2A are cross-sectional views of one bead area of a run-flat tire according to the invention and a standard rim showing the relationship of the molded tire with respect to a standard rim before being mounted on the rim;

DETAILED DESCRIPTION OF THE PREFERRED EMBODIMENTS

Figure 1:
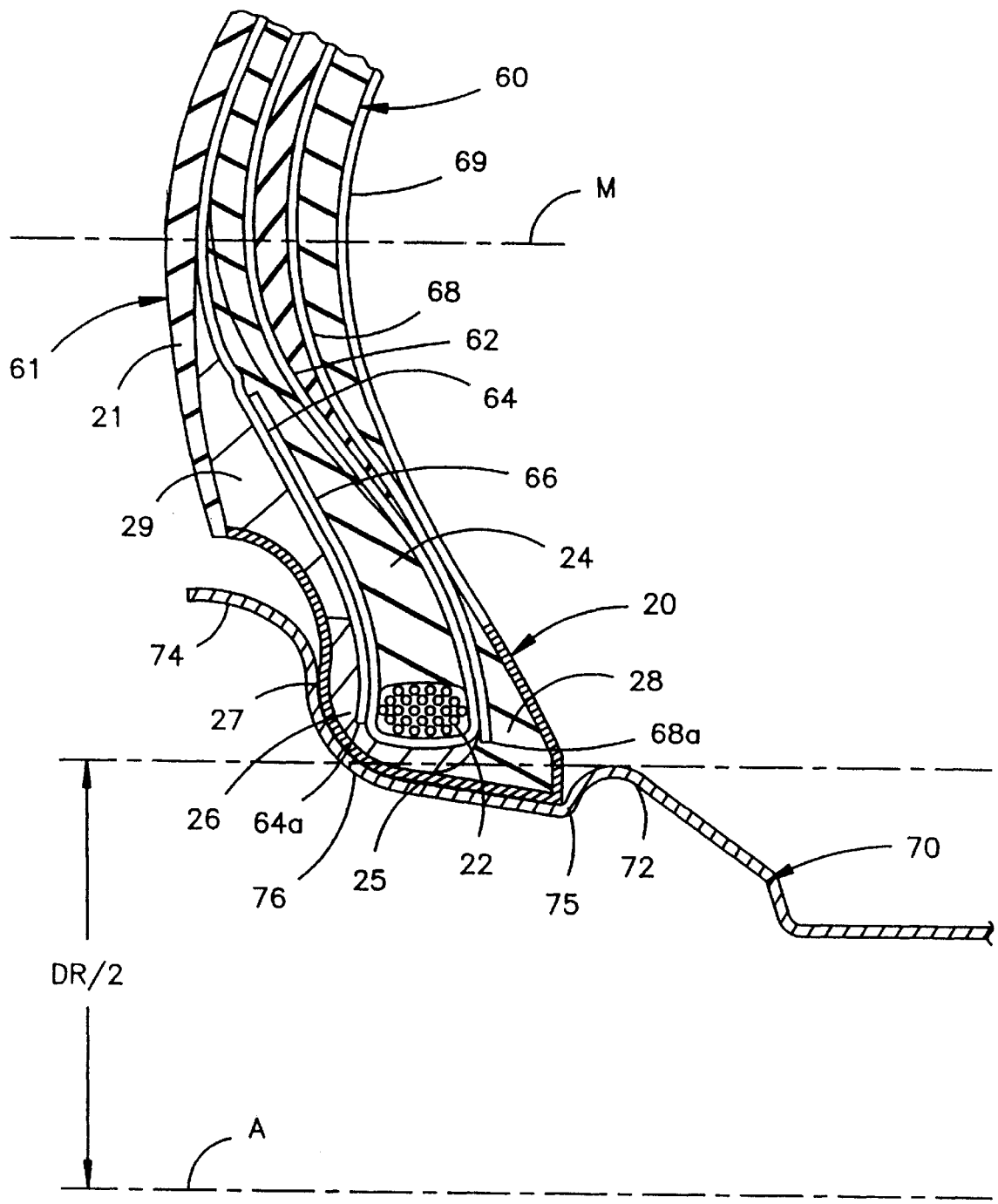
FIG. 1 is a cross-sectional view of one bead area of a run-flat tire according to the prior art showing the tire mounted on a special rim.

The interface between each annular bead of a run-flat tire and the rim of a vehicle using run-flat tires is critical to the safe and efficient operation of the vehicle. The previous discussion illustrates the importance of keeping the run-flat tire mounted on the rim with a loss of inflation pressure. A typical run-flat tire of the art is illustrated in FIG. 1. This run-flat tire has a sidewall 61 with sidewall reinforcing members 60 which combine with reinforced carcass layers 62, 64 and 68 to support the load of a vehicle with a loss of inflation pressure in the run-flat tire. Other run-flat tire designs are disclosed in the background section of this invention and are known in the art which are similar to the typical run-flat tire used herein. The run-flat tire of FIG. 1 has the essential components of a run-flat tire to demonstrate the improvements in the present invention.

A sidewall rubber 21 of the sidewall 61 typically covers the outer surface of the tire and keeps the carcass layers and the reinforcing members from damage, as illustrated in FIG. 1. The bead area 20 has a number of components which provide support for the loads being transferred to a rim 70 and for interfacing with the rim. A bead filler 24 is provided which extends radially outward from a bead core 22 and becomes one of the sidewall reinforcing members. Inner and outer carcass layers 68 and 64 extend to radially inward to end points 68a and 64a respectively near the bead core. The middle carcass layer 62 partially wraps around the bead core and forms a turn-up carcass layer 66 adjacent the bead filler to provide a long lapp length with outer carcass layer 64. Three different rubber components are used to the exterior of the carcass layers in the bead area. A rim seat portion 26 is located between a heal flange portion 29 and a toe portion 28. A reinforced seat ply 27 interfaces with a special rim 70. The bead seat portion adjacent the seat ply helps the seat ply to contact a curved area and an outermost flat area 76 of the rim to develop a interface pressure to hold the run-flat tire on the rim. The toe rubber 28 helps the seat ply to contact a special hump 72 on rim 70 at a hump point 75 so that the run-flat tire remains seated on the rim with the loss of inflation pressure. The heal flange rubber 29 helps transfer loads into the sidewall of the run-flat tire with the loss of inflation pressure. Additional components added to the lower sidewall and bead area of a run-flat tire are known in the art to improve bead seating an load supporting capabilities of the run-flat tire. These additional components include but are not limited to chafers, reinforced plies and the like. The extent and number of different components in the bead lower sidewall and bead area make the run-flat tire more complex to manufacture and less economical to produce.

The run-flat tire of this invention is suited to be used on conventional rims and has been simplified by using only a limited number of components in the lower sidewall and bead area of the run-flat tire. The size and shape of the present run-flat tire also control the ability of run-flat tire to be mounted on the conventional rim and to remain on the rim with a loss of inflation pressure. The use of materials for the various components of the bead area of the run-flat tire of this invention further enhance its performance. The lower sidewall and bead area of a run-flat tire 10 of this invention is illustrated in the cross-sectional view of a single bead area in FIG. 2. The run-flat tire has been molded to have a shape and size for mounting on a conventional rim 80.

Bead areas 30 for the run-flat tire of this invention have been designed to work with a run-flat tire having sidewall stiffening members 50, a pair of bead cores 32 and a plurality of carcass layers 40. The run-flat tire illustrated has three sidewall stiffening members including a first bead filler 34. Stiffening members extending from the bead area radially outward into the sidewall, to support loads on the rim from a ground surface when the run-flat tire is mounted on the rim. There are three carcass layers illustrated to including an inner carcass layer 48, a middle carcass layer 42 and an outer carcass layer 44. The carcass layers are disposed with the sidewall stiffening members is forming run-flat tire 10. The carcass layers include a conventional rubber matrix radially reinforced with conventional parallel reinforcing members or synthetic cords which extend essentially radially; being at an angle of less than about 15 degrees from a radial plane containing the axis of rotation A of the run-flat tire, as shown by the cross-section of FIG. 2. The sidewall supporting members are made of rubber material having a high modulus and hardness convention in the art. Other sidewall configurations are within the scope of this invention including run-flat tires with one or two sidewall stiffening members and two carcass layers.

In another embodiment of the invention each bead filler of this invention is made in two parts to improve the manufacturing process in obtaining a good bond with bead core 32. First bead filler 34 extends radially outward into the sidewall and provides one of the sidewall stiffening members 50 on each lateral side of the run-flat tire. A second bead filler 37 has a gum drop cross-sectional shape and is placed radially outward of the bead core to provide a softer material having a lower Modulus. The soft second bead filler improves the manufacturing process when forming the tire into a thyroidal shape. This lower modulus material of the second bead filler also allows the bead core to conform better to the shape of the rim when mounting the run-flat tire and when the tire is running with the loss of inflation pressure. The first bead filler is made to have a Shore A hardness with a value in the range of about 70 to 90 and a Modulus of Elasticity at ten percent unit strain with a value in the range of about 7 MegaPascals (MPa) to about 15 MPa. The second bead filler 37 is made to have a Modulus less than the Modulus of the first bead filler. The second bead filler has a Modulus of Elasticity in tension at ten percent strain with a value in a range of about 3 MPa to about 10 MPa.

Figure 2:
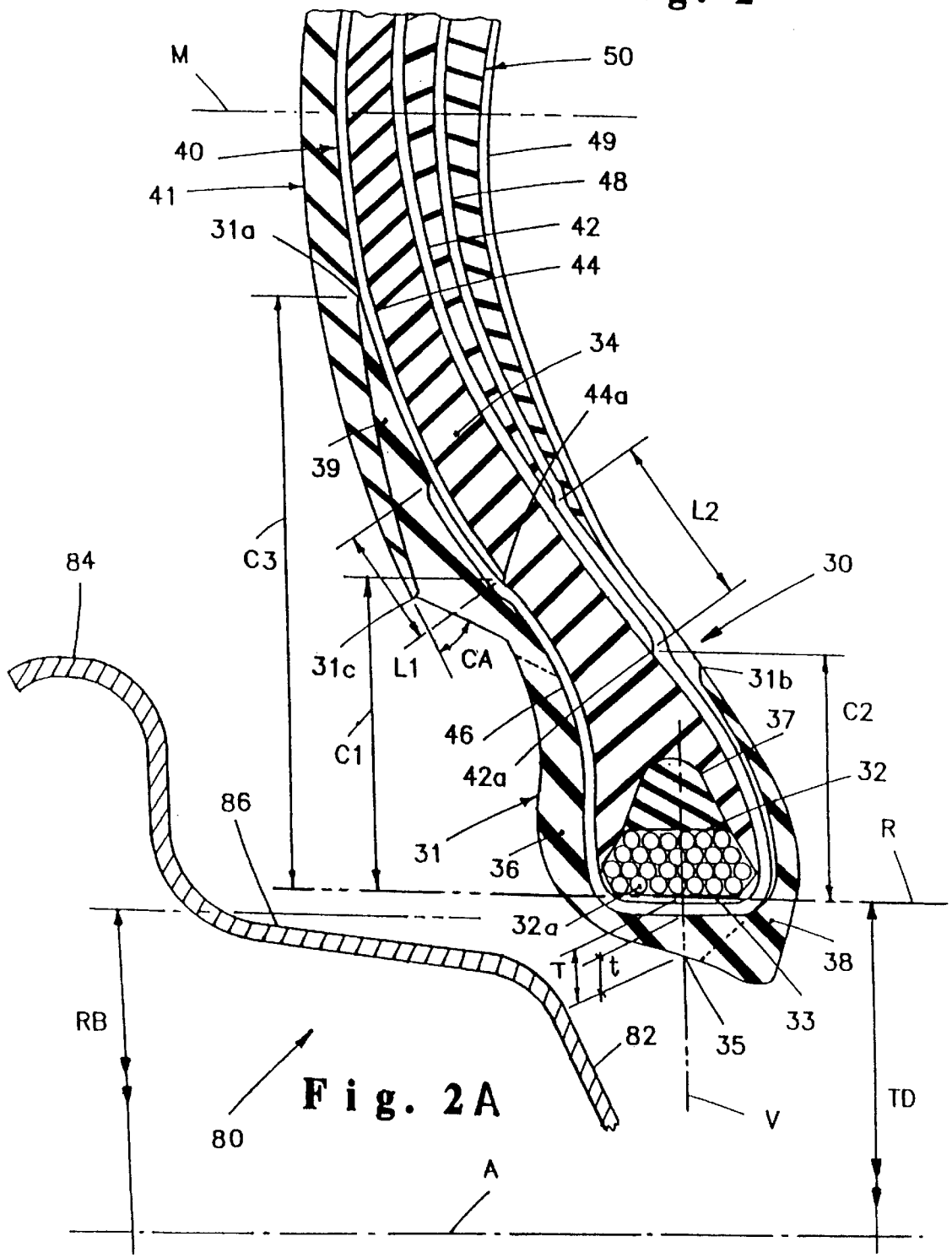

The carcass layers of the run-flat tire of this invention are truncated as they approach the bead core 32. One carcass layer extends around the bead core and turns up to extend radially outward toward sidewall 41. The inner carcass layer 48 is illustrated in FIG. 2 to have a turn-up portion 46 that overlaps with the outer carcass layer 44. The middle carcass layer 42 is terminated as it laps with the outer carcass layer radially outward of the bead core. Which carcass layers are terminated and which are turned up around the bead core are not critical. However, the configuration illustrated and described is the preferred configuration for improved performance and for economy in manufacturing the run-flat tire. Outer carcass layer 44 has been terminated a distance C1 above a bead reference line R. The bead reference is defined by an imaginary plane contacting filaments 32a on the flat interior surface 33 of the bead core 32. Bead reference R is parallel to the axis of rotation A of the run-flat tire. An end point 44a of the outer carcass layer is terminal at the distance C1 having a value in the range of about 10 millimeters to about 30 millimeters. The middle carcass layer 42 is terminated at an end point 42a which has a distance C2 radially outward of the bead reference R. Distance C2 has a value in the range of about 15 millimeters to about 25 millimeters. Lap distances L1 and L2 are necessary with carcass layer 48 before the carcass layers 42 and 44 can be terminated. Carcass layers 44 and 42 have a lap distances L1 and L2 respectively with a value in the range of about 10 millimeters to about 25 millimeters.

In a further embodiment the bead core 32 of the bead area 30 is preferably made with a plurality of layers formed by an annular coil of wire or synthetic cord filaments 32a nestled together, as illustrated in FIG. 2. Each layer is made to be an equal distance from the axis of rotation in this preferred embodiment. The position of the bead core of a cured tire with respect to the rim 80 on which it is to be mounted is critical for mounting the run-flat tire and keeping the tire seated on the rim with a loss of inflation pressure within the run-flat tire. Flat interior surface 33 defined by reference line R is used to properly locate the bead core of the cured tire. An internal bead core diameter TD is measured to the reference line defining the flat interior surface. The internal bead core diameter is measured when the tire is cured and the beads 30 of the run-flat tire are spaced axially apart a distance corresponding to a width of a conventional rim on which said tire is to be mounted.

Defining a relationship between the internal bead diameter TD to a conventional rim diameter RD establishes a critical design parameter unique to the present invention. Conventional rims are defined herein to refer to Standard Rim Contours defined in the 1997 Year Book of the Tire and Rim Association, Inc. of Copley, Ohio on pages 8-04 to 8-09. The information of this reference is a part of this disclosure by reference thereto. The internal bead core diameter TD of the bead core 32 of the run-flat tire of this invention is made about five millimeters larger than the rim diameter RD of rim 80 on which the run-flat tire is to be mounted.

Another embodiment of the present invention is the ability to easily mount the run-flat tire on a rim. In combination with the bead diameter to rim diameter relationship, the ability to easily mount the run-flat tire on the rim and keep bead area 20 seated on rim 80 with a loss of inflation pressure within the run-flat tire is very important. This ability is partially controlled by the amount and type of components to be located between the bead core and the rim. These components are defined herein to include elastomeric portions 31 as well as any rubber plies (including carcass layers) which are radially inside flat interface surface 33 of the bead core. A seat interface distance T is defined to be a distance measured radially between the flat interface surface and an innermost surface point 35 of rim seat portion 31 along a vertical centerline V through a respective bead core 32. Seat interface distance T has a value in the range of about four millimeters to about six millimeters. Preferably the seat interface distance is made so that the rubber rim seat rubber portion comprises more than 70 percent of interface distance T. Consistent with the seat interface distance the rubber rim seat portion must have a Shore A hardness and a Modulus which will provide an interface pressure between the rim and the run-flat tire to keep the tire is inflated and to keep the run-flat tire seated on the rim when the tire is deflated. The rim seat portion is made of an elastomeric material having a Shore A hardness value in the range of about 50 to about 80 and a Modulus of Elasticity in tension at 10 percent unit strain with a value in a range of about 5 MegaPascals (MPa) to about 9 MPa.

Another design parameter is defined so that bead core 32 can generally be considered as a non-extensible annular ring when mounting the run-flat tire on the rim. However, some stretching of the bead core does occur when the run-flat tire is mounted on the rim and a circumferential change in length does result in a small but important change in its internal diameter TD of the bead core. To control these small but important changes the bead core is made to have a tensile strength at one percent of unit strain of the bead core with a value in the range of about 1100 to 3000 Newtons per square millimeter. A torsional rigidity of the bead core is also important in keeping the run-flat tire seated on the rim. The torsional rigidity is discussed and defined in a later section.

In another embodiment rim interface components of each bead 30 include elastomeric portions 31 as well as any carcass layers or other reinforcing layers which are wrapped around the bead core. Rim interface components include any component that extends between bead core 32 and a rim seat 86 as well as components which contact a rim flange 84. Rim interface components include elastomeric portions 31 being a toe portion 38, a rim seat portion 36 and a heel flange portion 39. Elastomeric portions can be separately applied portions when making the run-flat tire, but are preferably combined to form a single unit construction in making the tire. The toe portion extends radially on the axial inside of the run-flat tire and laps with an innerliner rubber 49 to help retain air within the run-flat tire.

The run-flat tire of FIG. 2 has been made to be mounted on the conventional rim 80 as illustrated in FIG. 2A. A relationship between the rim diameter RB and the diameter TD of the bead core, measured to the innermost surface defined by the bead reference line R, has been discussed. In general, the rim diameter is about five millimeters smaller than the diameter of the bead core for all run-flat tire sizes. As the run-flat tire is placed on the rim, the tire is over-inflated as it is forced axially outward over a drop center 82 and onto the rim. Rim seat portion 36 of elastomeric portions 31 of the rim interface components of the run-flat tire contact a rim seat 86 of the rim and the run-flat tire is seated. The rim seat portion is compressed against rim seat 86 of rim 80 to provide a seal to retain air in the tire. A rim flange 84 of the rim does not contact the run-flat tire during this mounting process, but is used as a fulcrum for using tools to help in mounting the tire on the rim.

Figure 3:
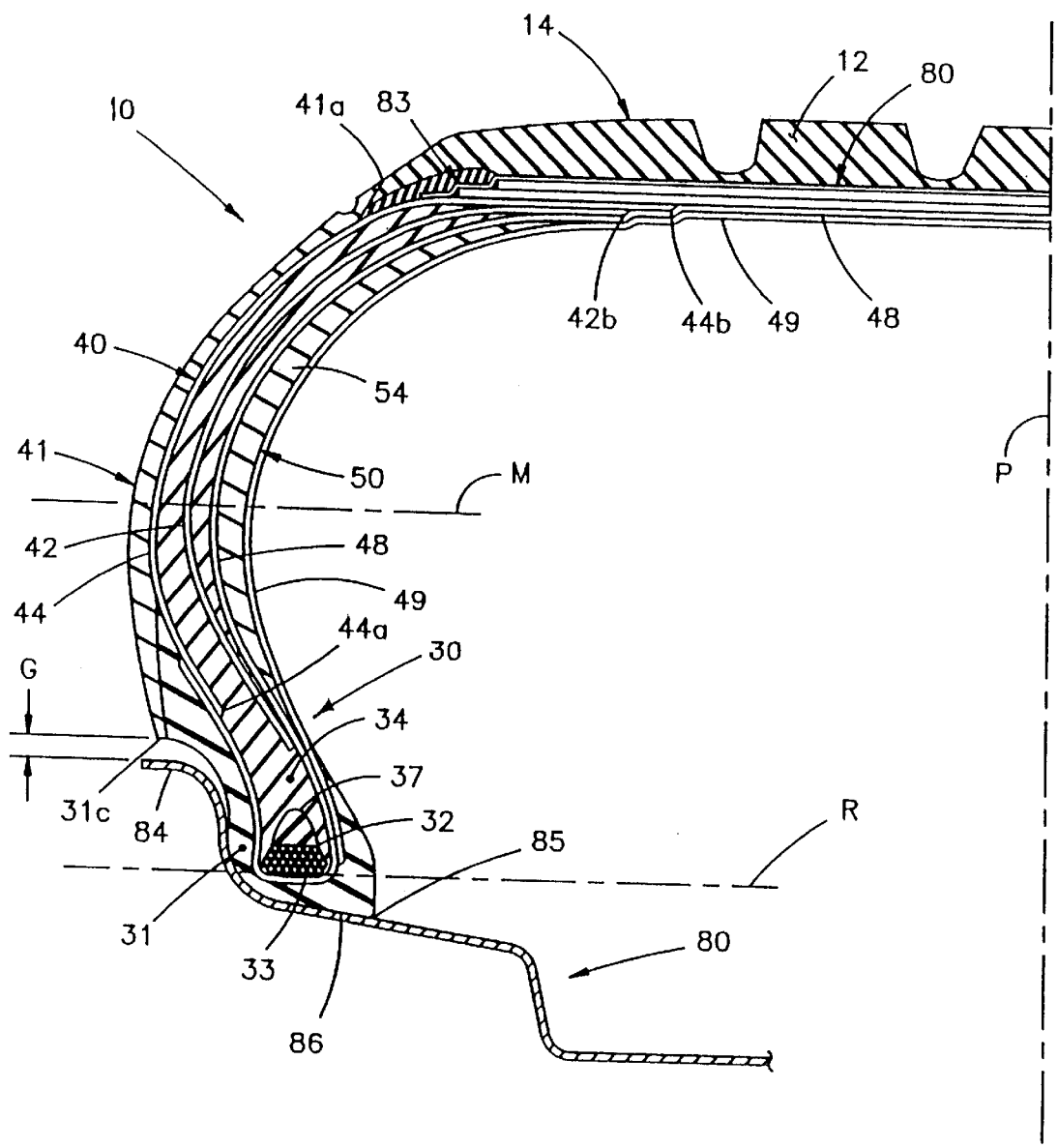
FIG. 3 is a cross-section view of the run-flat tire of this invention mounted on a standard rim and inflated, the tire being symmetrical about a midcircumferential plane of the tire.

The tire mounted and inflated on a conventional rim is illustrated in FIG. 3. The run-flat tire 10 of this invention is mounted on rim seat 86 of rim 80 and inflated to a conventional inflation pressure for use on a vehicle. The cross-sectional view of FIG. 3 shows only half of the run-flat tire with the run-flat tire being symmetrical with respect to a midcircumferential plane P of the run-flat tire. An innerliner rubber 49 is provided on the inside surface for maintaining air within the run-flat tire. The crown portion of the tire includes a tread 12 having a tread surface 14 for contacting a ground surface to support a vehicle by transferring vehicular loads from the rim through the tire to the ground surface. The tread is supported by a plurality of reinforced belt plies 80 in a band around the tire interior to the tread. The belt plies extend laterally over the crown of the tire from one shoulder 83 to the other shoulder.

The run-flat tire of FIG. 3 further illustrates at least one carcass layer 48 extending from one annular bead 30 to the other annular bead. Other carcass layers 42 and 44 are preferably terminated at ends 42b and 44b as they lap with the belt plies at each shoulder 83. The carcass layers can all extend from bead to bead within the scope of this invention. The carcass layers are disposed with the sidewall stiffening members 50 extending from the shoulder to the annular bead in each sidewall 40 of the run-flat tire. Preferably two carcass layers 42 and 44 are terminated at points 42a and 44a above the bead core 32 of each annular bead. The sidewall stiffening members include crescent shaped members such as crescent member 54. The first bead filler 34 also provides one of the sidewall stiffening members in this embodiment of FIG. 3. Other known arrangements of carcass layers and sidewall stiffening members can be used within the scope of this invention. Once again, the use of a second bead filler 37 having a material with more flexibility than the first bead filler helps with both mounting the run-flat tire on the rim and in the fabrication process.

The second bead filler 37 shown in FIG. 3 is smaller and softer than the first bead filler 34 for providing advantages in forming a green run-flat tire during the tire building process and during mounting of the cured run-flat tire on a rim. In addition, the performance of the run-flat tire can be improved during running of the vehicle by the addition of the second bead filler. The second filler has a preferred gum-drop shape in the embodiment shown. The cross-sectional length and width of the second bead filler can vary to enhance making the run-flat tire and its use with a vehicle. The second bead filler is bounded by the first bead filler and the bead core in the cured run-flat tire.

One advantage of the addition of the second bead filler radially outward of each bead core 32 is realized during a conventional tire building process. The second filler helps in forming a green tire into a toroidal shape from a cylindrical shape during the tire building process. The harder first bead fillers are initially placed on a cylindrically shaped tire building drum axially interior to respective bead cores. The softer second bead fillers are placed radially outward of the respective bead cores. The green tire is removed from the cylindrical tire building drum and formed into a toroidal shape. During formation of the toroidal shape the first filler is rotated around the stationary bead core to become radially outward of the second filler and the bead core in each bead area 30. The second filler is made to remain stationary around the bead core as the first filler rotates. This tire building process has the advantage of allowing the first bead filler to easily rotate from an initial position to a rotated position. Problems associated with an elongated or odd shaped bead core are compensated by the second bead filler. In addition, odd shaped bead cores of the art frequently have problems with voids adjacent the bead core of a cured tire. Voids adjacent the bead core are essentially eliminated by the addition of the second bead filler of this invention.

Another advantage of the addition of a second bead filler in accordance with this invention is realized when a cured run-flat tire is being mounted on a rim. The flexibility of the softer second bead filler allows the bead core to be more compliant with the stiffened sidewalls of the run-flat tire. The bead core becomes deformed or deflected from its annular ring shape as the run-flat tire is being mounted. The bead core is restrained less by the softer more resilient rubber of the second bead filler during mounting, so that the forces and overpressures used to mount the run-flat tire are reduced as a result of the second bead filler.

Figure 4:
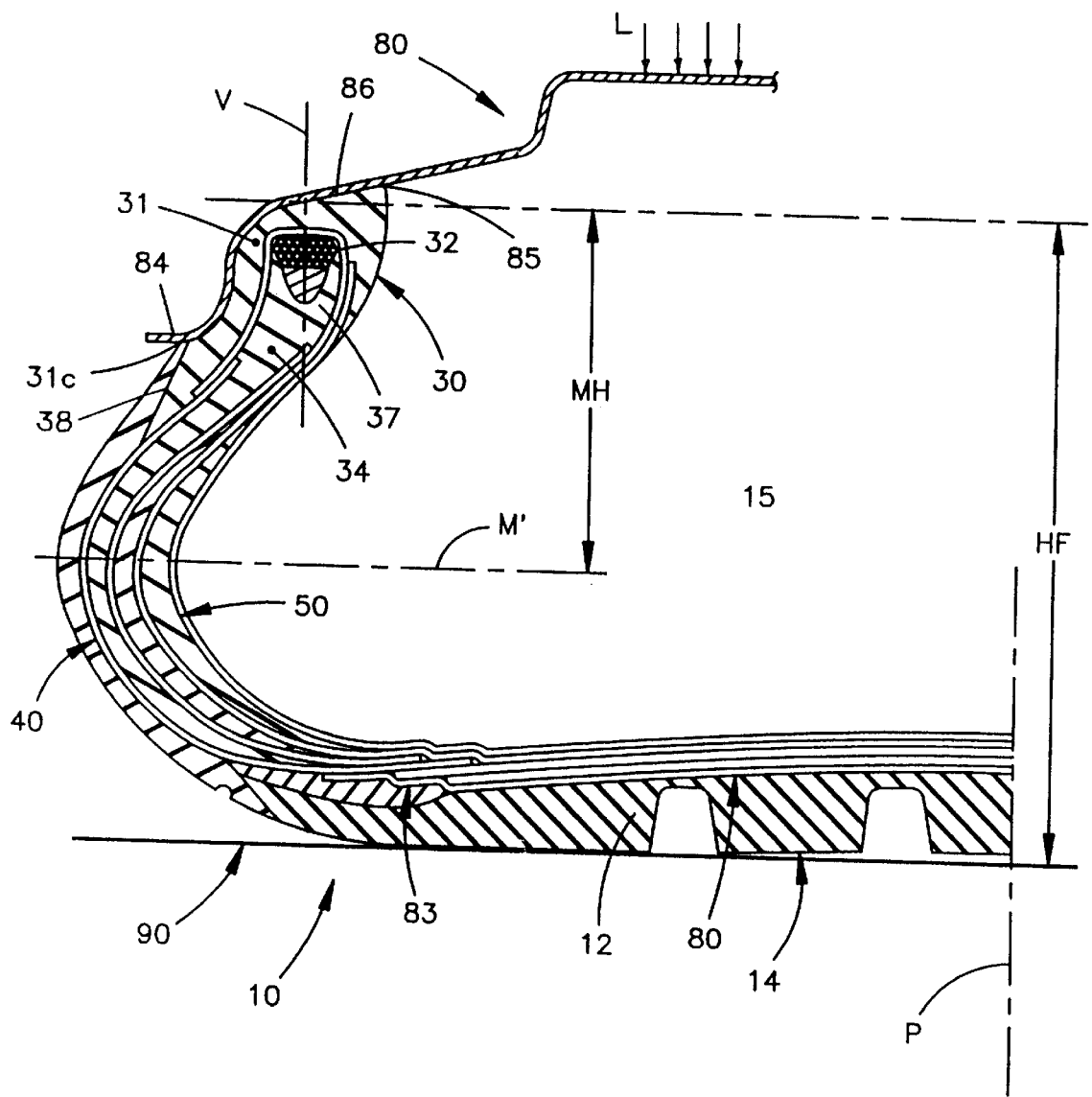
FIG. 4 is a cross-sectional view of the run-flat tire of this invention mounted on a standard rim in contact with a ground surface and supporting a vehicle load with the loss of inflation pressure, the tire being symmetrical with respect to a midcircumferential plane.

Additional advantages of the addition of the second bead filler illustrated in FIGS. 2, 3 and 4 are associated with the performance of a vehicle having the run-flat tires of this invention. The presence of the second bead filler will have an influence on the ride comfort and handling of the vehicle. The shape and extent of the second bead filler in the inflated run-flat tire is optimized to improve ride comfort and handling. With the loss of inflation pressure the run-flat tire deforms or deflects to support the vehicle through the supporting sidewalls of the run-flat tire, as illustrated in FIG. 4. The bead area along with the bead fillers bend so that the run-flat tire best conforms to the shape of the rim without displacing the bead core or greatly reducing the seating pressures at the run-flat tire to rim interface. The ability of the bead fillers to help the run flat tire conform to the rim is enhanced by the addition of the second bead filler. Bending of the bead area is more critical during lateral maneuvers of the vehicle and cornering maneuvers by vehicle are improved by the addition of a second bead filler.

Generally speaking, the overall design of the first and second bead fillers along with the bead core results in an improved process for making the run-flat tire, improved mounting of the run-flat tire on a rim and improved driving performances of the vehicle when the run-flat tire is inflated and with a loss of inflation pressure.

A further embodiment of the invention is illustrated by the gap distance G provided between rim flange 84 and a heel corner 31c of elastomeric portions 31, as illustrated in FIG. 3. A gap distance is known to be necessary for the inflated run-flat tire to respond to vehicular maneuvers and maintain good vehicle handling and cornering performance. An initial gap distance is provided for the run-flat tire mounted on a conventional rim and inflated to a conventional inflation pressure. Gap distance G has an initial value in the range of about 3 millimeters to about 8 millimeters depending on the size of the run-flat tire and the application rim width. This initial gap distance begins to decrease as the run-flat tire starts loosing inflation pressure.

The run-flat tire of this invention is made to have a predetermined initial inflation pressure for seating the tire on the rim when the run-flat tire is being mounted. The initial inflation pressure for run-flat tire 10 has an average value in a range of about 30 pounds per square inch (psi) to about 40 psi. The interfacing surfaces of the tire's interface components 31 and rim seat 86 of the rim are usually lubricated to reduce the effort in mounting the run-flat tire on the rim. The toe point 85 of the bead is to become positioned on the rim so that uninterrupted contact is made between the run-flat tire and the rim when the run-flat tire is fully mounted on the rim.

Inflating the mounted run-flat tire of this invention to a conventional inflation pressure known in the art makes the run-flat tire ready for use on a vehicle. Standard inflation pressures are given in the 1997 Year Book of the Tire and Rim Association, as previously referenced, for different tire sizes. The mounted and inflated run-flat tire of this invention results in an average interface pressure between the run-flat tire and the rim having a value in a range of about 220 psi to about 365 psi. The preferred average interface pressure for run-flat tire 10 on a passenger car has a value of about 290 psi when the run-flat tire is inflated to about 30 psi. The distribution of this pressure is controlled by the run-flat tire of this invention so that no uninterrupted contact is present at the interface between the run-flat tire and the rim. This 290 psi pressure is referred to herein as the running interface pressure. The running interface pressure of the run-flat tire of this invention represents an increase of about 30 percent to about 40 percent above that for conventional tires and rims of the same size and loading capacity. The running interface pressure is very important to ensure a tight seal for air retention within the tire and to help ensure adequate zero inflation pressure seat retention of the run-flat tire on the rim.

The run-flat tire of this invention running loaded with zero inflation pressure and in contact with a ground surface is illustrated in FIG. 4. This figure also shows a cross-sectional view of only half of a run-flat tire 10 which is symmetrical about the midcircumferential plane P. The Run-flat tire is mounted on rim 80 which is loaded by load L as the result of supporting the weight of a vehicle. The rim interface components 31 of bead area 30 remain in contact with rim seat 86 and the toe point 85 remains at the rim seat. The Bead core 32 has been able to keep the run-flat tire on the rim and the bead fillers 34 and 37, along with the other sidewall stiffening members 50 and carcass layers 40, have deformed as a unit to support the vehicle. A ground surface 90 contacts tread surface 14 of the tread 12. Belt plies 80 supporting the tread have a reverse curvature to transfer the loads on the tread surface to each shoulder 83 of the run-flat tire. The sidewall stiffening members and the carcass layers act as a deformed beam to transfer loads to the rim with a loss of inflation pressure.

An essential embodiment of the run-flat tire of this invention is the contact of the tire with rim flange 84 of the rim, as illustrated in FIG. 4. This contact between the heel flange portion of the rim interface components 31 and the rim flange allows the loads on the run-flat tire to be transferred directly to the rim flange. Heel corner 31c is essential in loading the rim flange without using the rim flange as a fulcrum to force bead core 32 away from bead seat 86. In other words, the load is transferred from the run-flat tire directly to the rim flange without introducing a prying action as the run-flat tire deforms with a loss of inflation pressure. A corner angle CA at the heel corner is measured by the angle made at the exterior surface as it bends around heel corner 31c. The corner angle has a value of at least 30 degrees when the run-flat tire is cured (FIG. 2). The radial gap distance G (FIG. 3) has been closed to zero. However, this occurs before the inflation pressure has decreased to zero within the run-flat tire. The heel flange portion 38 of the rim interface components makes contact with rim flange 84 when the inflation pressure becomes less than about 15 percent of the conventional inflation pressure of the inflated run-flat tire. This unique feature of the run-flat tire of this invention allows the tire to be fully seated on the rim before the total loss of inflation pressure; to insure the proper support of the run-flat tire by the rim.

A further embodiment of the run-flat tire of this invention is realized by defining the size, strength and flexibility of the bead core 32. As illustrated in FIGS. 2–4, the bead core is a fundamental structural component in the various stages of providing a run-flat tire, mounting the tire and supporting the tire on a rim during inflated and deflated conditions of the run-flat tire. The tensile strength of the bead core is discussed above in relation to mounting and retaining the run-flat tire on a conventional rim. The ability of the bead core to resist being twisted is quantified by its torsional rigidity. The torsional rigidity of the bead core 32 is very important, particularly when maintaining the run-flat tire on the rim with a loss of inflation pressure. Torsional rigidity of bead core 32 made of a annular coil of wire filaments is realized by measuring the moment or torque required to rotate a 100 millimeter long test sample of the bead core through an angle of 2.5 degrees. The torsional rigidity of bead core 32 for the run-flat tire of this invention should be at least 100 Newton meters per radian and is preferably about 200 Newton meters per radian. In addition, the torsional moment of inertial of the cross-sectional area of the bead core is made to have a value in a range of about 150 millimeters to the fourth power to about 350 millimeters to the fourth power, and preferably about 200 millimeters to the fourth power.

EXAMPLES

Sufficient bead retention capability of the run-flat tire of this invention have been demonstrated when used on standard vehicles. Both beads remained seated on the rim with zero inflation pressure in the tire during all moderate and many severe maneuvers; including the forty five mile per hour brake and turn maneuver used in the industry as a standard for run-flat tire development. Many of the industry standard maneuvers involve lateral acceleration values in excess of 0.5 times the acceleration of gravity (0.5 Gs). The run-flat tire of this invention exceeded all of the requirements of these tests.

In very severe maneuvers, with standard vehicles going well beyond standard test maneuvers, the run-flat tire with zero inflation pressure remained on the rim with only the inner bead seated on the rim seat. The retention of the run-flat tire seated on at least one side of the rim enabled the vehicle to recover from a very severe maneuver and still provided the vehicle with continued mobility.

From the above description of preferred embodiment of the invention, those skilled in the art will perceive improvements, changes, and modifications. Such improvements, changes, and modifications within the skill of the art are intended to be covered by the appended claims.

What is claimed is:

1. A radial run-flat tire comprising:
   a pair of sidewall portions;
   a plurality of crescent shaped sidewall members in each sidewall portion for supporting said tire with a loss of inflation pressure;
   a pair of spaced apart annular beads;
   a pair of radially reinforced carcass layers extending from bead to bead and disposed about said crescent shaped sidewall members;
   a middle carcass layer extending from bead to bead between crescent shaped members and having both ends partially encircling a respective bead core and turned-up around said bead core to lap with an outermost one of said pair of carcass layers; and
   first and second bead fillers each disposed radially outward of each bead core and axially between carcass layers, said first bead filler extending radially outward from said bead core to form one sidewall member of said plurality of crescent shaped sidewall members and said second bead filler bounded by said first bead filler and said bead core for providing a filler material adjacent the bead core with a lower hardness than that of the first bead filler.

2. The run-flat tire of claim 1 further comprising:
   a bead core within each one of said beads having an annular coil of wire or synthetic filaments generally forming a polygonal shaped cross section with a predetermined tensile strength, said bead core having an imaginary flat innermost surface defined by an imaginary plane contacting said filaments, said innermost surface forming an internal diameter of said bead core.

3. The run-flat tire of claim 2 wherein said tensile strength of said bead core is defined by a tensile strength at one percent unit strain with a value in a range of about 1100 Newtons per square millimeter to about 3000 Newtons per square millimeter.

4. The run-flat tire of claim 3 wherein a torsional rigidity of the bead core is at least 100 Newton meters per radian.

5. The run-flat tire of claim 4 wherein said torsional rigidity of the bead core is about 200 Newton meters per radian.

6. The run-flat tire of claim 3 wherein a torsional moment of inertia of the cross-sectional area of said bead core is in a range of about 150 millimeters to the fourth power to about 350 millimeters to the fourth power.

7. The run-flat tire of claim 6 wherein the torsional moment of inertia of the bead core is about 200 millimeters to the fourth power.

8. The run-flat tire of claim 1 further comprising:

a plurality of elastomeric interface component portions in each bead including a toe portion, a rim seat portion and a heel flange portion forming a single component and having a predetermined hardness and elastic properties for interfacing with a conventional rim for the tire when mounted thereupon, wherein said heel flange portion has a heel corner with a radial gap distance from a rim flange when said run-flat tire is mounted on said rim and inflated to its conventional inflation pressure.

9. The run-flat tire of claim 8 wherein said predetermined hardness of said elastomeric interface component portions have a Shore A hardness value in a range of about 50 to about 80.

* * * * *